(12) United States Patent
Nallasivan et al.

(10) Patent No.: US 8,249,996 B1
(45) Date of Patent: Aug. 21, 2012

(54) ARTIFICIAL INTELLIGENCE FOR SOCIAL MEDIA

(75) Inventors: Srinivasan Nallasivan, Charlotte, NC (US); David D. Price, Kennewick, WA (US)

(73) Assignee: Bank of America Corporation, Charlotte, NC (US)

( * ) Notice: Subject to any disclaimer, the term of this patent is extended or adjusted under 35 U.S.C. 154(b) by 231 days.

(21) Appl. No.: 12/708,406

(22) Filed: Feb. 18, 2010

(51) Int. Cl.
*G06Q 10/00* (2006.01)
(52) U.S. Cl. .......................................... 705/321
(58) Field of Classification Search .................. None
See application file for complete search history.

(56) References Cited

U.S. PATENT DOCUMENTS

2006/0042483 A1* 3/2006 Work et al. .................... 101/91
2009/0234878 A1* 9/2009 Herz et al. .................... 707/102
* cited by examiner

*Primary Examiner* — Jonathan Ouellette
(74) *Attorney, Agent, or Firm* — Weiss & Arons LLP; Michael Springs

(57) ABSTRACT

Apparatus and methods for evaluating the likelihood that a candidate will match an employment requirement. The apparatus and methods may be used for electronically accessing a plurality of text strings. A computation machine may score the text string using an objective function module. The objective function module may generate an output score that corresponds to the likelihood of a match between the text string and an employment requirement. Based on the score, the candidate may be invited to participate in an electronic dialog, such as a chat session or electronic message exchange, with a recruiting agent. The computation machine may be used to generate supplemental scores based on the chat session or subsequent chat sessions. The scores may be used to evaluate the likelihood of the match.

19 Claims, 9 Drawing Sheets

302 — I'm Tired of My Job

304 — I Have to Find Another Job

306 — I'm Ready for a Career Change

308 — I've Been Doing this for Too Many Years Already

310 — I Don't Like My Boss

312 — My Boss doesn't Fulfill his Responsibilties

314 — My Current Job did not Pay Enough Money

316 — My Husband and I Want to Relocate to the East Coast

I'd Like to Have an Opportunity to Work Abroad

320

This Ex-pat Lifestyle is Growing Old

322

My Parents are Growing Old

324

I am not Enjoying My Job

326

The Pay isn't so Great But I'm Getting Terrific Experience

328

I'd Like to Find a Job with more Responsibility and Higher Compensation

330

There is not Many Opportunities to Find Jobs that Let you Write, but I Want to Find One Before Long so that I May Start My Career as a Writer *That has Taken So Long to Start

332

It's Time to Find a New Gig

FIG. 3B

518 — I'd Like to Have an (Opportunity) to [Work] Abroad  {2}

520 — This Ex-pat Lifestyle is Growing Old

522 — My Parents are Growing Old

524 — I am /not/ (Enjoying) My /Job\  {1} {2}

526 — The Pay isn't so Great But I'm Getting Terrific Experience

528 — I'd Like to Find a /Job\ with more )Responsibility( and Higher )Compensation(  {3}

530 — There {is not Many (Opportunities)} to Find /Jobs\ that Let you Write, but I Want to Find One Before Long so that I May Start My (Career) as a Writer *That has Taken So Long to Start  {3} {3}

532 — It's Time to Find a New (Gig)

ARTIFICIAL INTELLIGENCE FOR SOCIAL MEDIA

FIELD OF TECHNOLOGY

Aspects of the disclosure relate to recruiting candidates for employment. In particular, the disclosure relates to evaluating the likelihood that a candidate will match an employment requirement.

BACKGROUND

In a typical candidate recruiting campaign, a recruiter utilizes advertising and individual searching to identify candidates that may satisfy an employment requirement. Both advertising and individual searching must reach large numbers of candidates and identify those candidates that are likely to be matched to the employment requirement. It can be difficult to reach large numbers of candidates. It can be even more difficult to obtain sufficient information about the candidates to evaluate likelihood of a match.

A large number of individuals make available via the Internet information about the individuals' qualifications and views regarding employment and reasons that the individuals may consider seeking new employment.

It would be desirable, therefore, to provide apparatus and methods for utilizing the information to evaluate the likelihood that a candidate will match an employment requirement.

It also would be desirable, therefore, to provide apparatus and methods for utilizing the information to provide guidance to a recruiter.

SUMMARY

Apparatus and methods for evaluating the likelihood that a candidate will match an employment requirement are provided. The apparatus and methods may be used for electronically accessing a plurality of text strings. A computation machine may score the text string using an objective function module. The objective function module may generate an output score that corresponds to the likelihood of a match between the text string and an employment requirement. Based on the score, the candidate may be invited to participate in an electronic dialog, such as a chat session or electronic message exchange, with a recruiting agent. The computation machine may be used to generate supplemental scores based on the chat session or subsequent chat sessions. The scores may be used to evaluate the likelihood of the match.

Apparatus and methods for recruiting a candidate for an employment requirement are provided. The apparatus and methods may involve selecting a term that is logically associated with a recruitment topic; finding the term in a textual dialog between a recruiter and an employment candidate; and identifying a recruiter script text corresponding to the topic.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows illustrative information that may be processed in accordance with the principles of the invention;

DETAILED DESCRIPTION OF THE INVENTION

Figure 1:
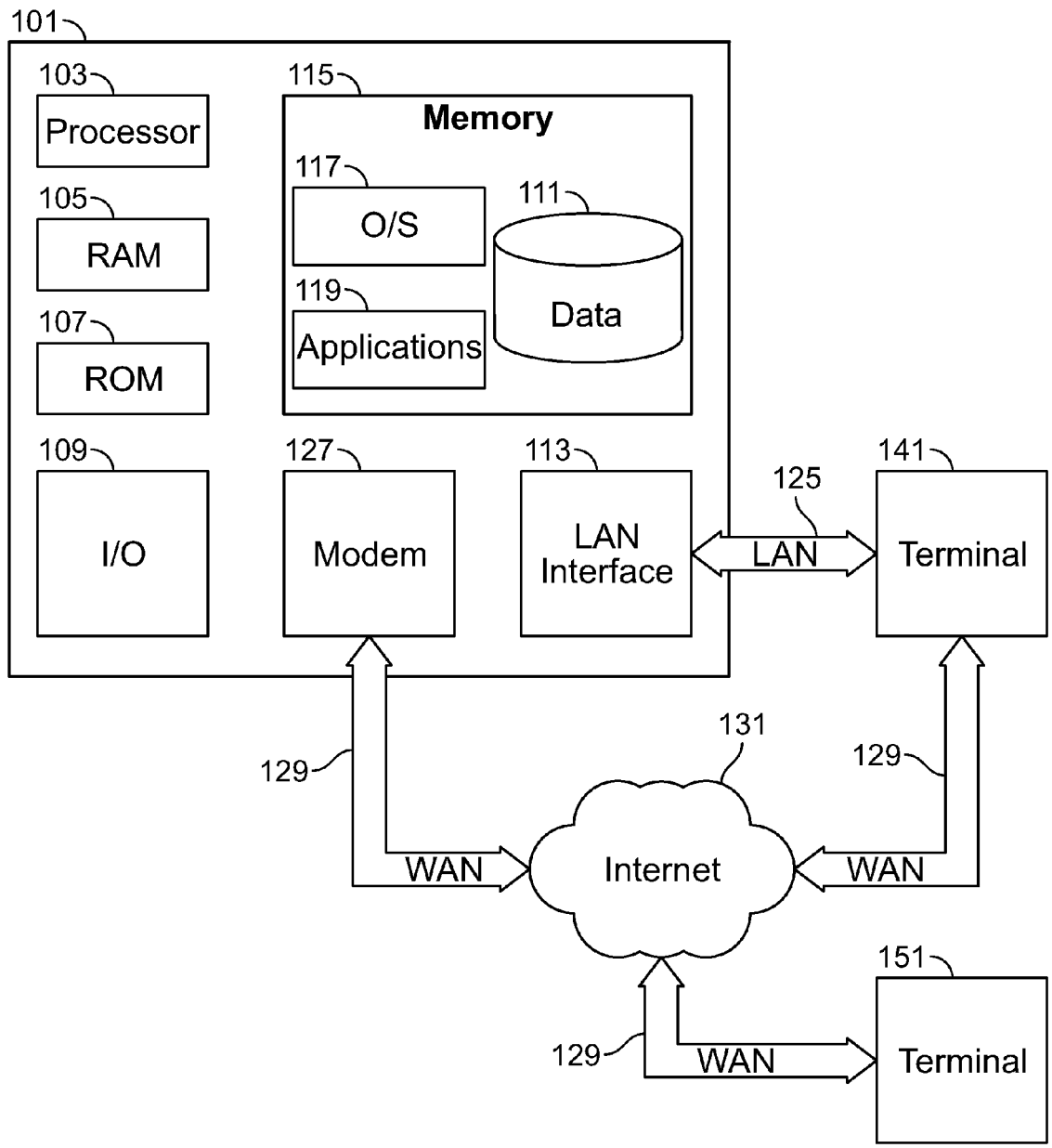
FIG. 1 shows illustrative apparatus in accordance with the principles of the invention.

Apparatus and methods for evaluating the likelihood that a candidate will match an employment requirement are provided. The employment requirement may be defined in any suitable way. For example, the employment requirement may be "any person," "any person who seeks employment," "any person who seeks professional employment" and the like. The apparatus and methods may be used for electronically accessing a text string. The text string may be part of a web page. The web page may be stored on a web server. The web page may be included in an online community. The community may be a personal community, a professional community or any other suitable type of community. The web page may be published as a blog, a microblog, a personal statement, a profile or any other suitable type of information. The text string may be associated with an individual. The web page or associated web pages may provide identity information about the individual. The web page or associated web pages may include contact information about the individual.

The online community may be any information system in which a member may post content. The online community may have a restricted membership. The online community may have an unrestricted membership. In some embodiments, the text string may be accessed outside of an online community. Examples of online communities include those available under the trademarks FLICKR, from Yahoo! Inc., Sunnyvale, Calif.; and FACEBOOK, from Facebook, Inc. Other examples of online communities include TheGlobe.com, GeoCities and Tripod.com, TWITTER and Del.icio.us In some embodiments, the text string may be accessed from a storage device that is in communication with an electronic communication network, such as the Internet.

The text string may be used to formulate a candidate record. The candidate record may include the text string, a candidate identifier, one or more screening level status fields, one or more scores and any other suitable information.

The screening level status field may be used to record information about the level of screening to which the candidate has been subjected. Each level of screening may have a corresponding score.

A computation machine may score the text string using an objective function module. The objective function module may generate an output score that corresponds to the likelihood of a match between the text string and an employment requirement. The candidate may be the author of the text string.

The candidate may be invited to participate in an electronic dialog, such as a chat session or electronic message exchange, with a recruiting agent. Participation in the electronic dialog may involve messaging within a web site, such as the web site on which the text string resides, short message service ("SMS"), email, instant messaging, PIN messaging, voice communication or any other suitable form of communication.

The computation machine may be used to generate supplemental scores based on the chat session or subsequent chat sessions. The scores may be used to evaluate the likelihood of the match.

Scores based on the chat session may be used to select the candidate for an oral interview.

One or more of the scores may be based on the presence of identified words in the text string.

One or more of the scores may be a binary output score. One or more of the scores may be based on language quality in the text string.

The computation machine may be configured to apply a neural network to predict the closeness of the match.

The computation machine may be configured to apply a semantic network library to predict the closeness of the match.

In some embodiments, the recruiting agent may execute a search in a social network for communications that include a key term. For example, the recruiting agent may search on Twitter for tweets that include the term "job." The search may identify a set of tweets that include the term "job." The recruiting agent may then execute a semantic network on the term "job." The semantic network may return output phrases that are semantically related to the term "job." Each of the output phrases may include a score indicating the closeness of the output phrase to the term "job." The score may be based on any similarity or closeness metric. For example, the score may be based on a dot-product of the term "job" and the output phrase. The score may be a scaled value based on the dot-product.

The recruiting agent may perform a new search for tweets that include the output phrase. For example, the selected output phrase may be "I am looking for a new employer." The new search will include tweets that include "I am looking for a new employer." The recruiting agent may perform further searching by inputting "I am looking for a new employer" or a different phrase into the semantic network. When an appropriate set of tweets is identified, one or more of the tweets' authors may be engaged.

In some embodiments, the output phrases may be filtered to eliminate output phrases that do not have a threshold score. In some embodiments, a score associated with a tweet may be recorded in a candidate record. In some embodiments, a hybrid score may be recorded in the candidate record. The hybrid score may be based on one or more of the scores associated with the individual output phrases. For example, when the input term is "job," the output phrases may include: (a) "I am looking for a new employer;" and (b) "I'd like to have better compensation." The hybrid score may be the average of output phrases (a) and (b). The hybrid score may thus be used as a measure of the likelihood that the tweet author is a person who is seeking a new job.

In some embodiments, the candidate may be a prospective purchaser of an item or service. In those embodiments, the apparatus and methods may be used to evaluate the likelihood of a match between the candidate and the item or service.

Also, apparatus and methods for recruiting a candidate for an employment requirement are provided. The apparatus and methods may involve selecting a term that is logically associated with a recruitment topic; finding the term in a textual dialog between a recruiter and an employment candidate; and identifying a recruiter script text corresponding to the topic.

The apparatus and methods may identify a dialog level that may be used as a basis for identifying the recruiter script text. The dialog level may correspond to a cumulative number of messages received by the recruiter from the candidate. The recruiter script text may be stored in a candidate record. The recruiter script text may be selected based on a historical association between the recruiter script text and a candidate. The historical association may be based on a quantitative indication that the script is more likely to lead to a personal interview than is a different script.

Illustrative embodiments of the invention will now be described with reference to FIGS. 1-8.

It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Aspects of the invention may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates generic computing device 101 that may be used in accordance with the principles of the invention. Device 101 may be a server. Computer device 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by device 101, such as an operating system 117, application programs 119, and an associated database 121. Alternatively, some or all of device 101 computer executable instructions may be embodied in hardware or firmware (not shown). As described in detail below, database 121 may provide storage for candidate records, text strings, screening level status field information, scores and any other suitable information.

Device 101 may operate in a networked environment supporting connections to one or more remote computers, such as terminals 141 and 151. Terminals 141 and 151 may be personal computers or servers that include many or all of the elements described above relative to device 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, device 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by device 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Data related to candidates, text strings, scores, scoring code and any other suitable information may be stored in memory 115.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIGS. 2-8 show illustrative processes and information in accordance with the principles of the invention. For the sake of illustration, the steps of the process illustrated those FIGS. will be described as being performed by a "system". The "system" may include one or more of the features of the apparatus that are shown in FIG. 1 and/or any other suitable device or approach. The "system" may be provided by an entity. The entity may be an individual, an organization or any other suitable entity.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 2:
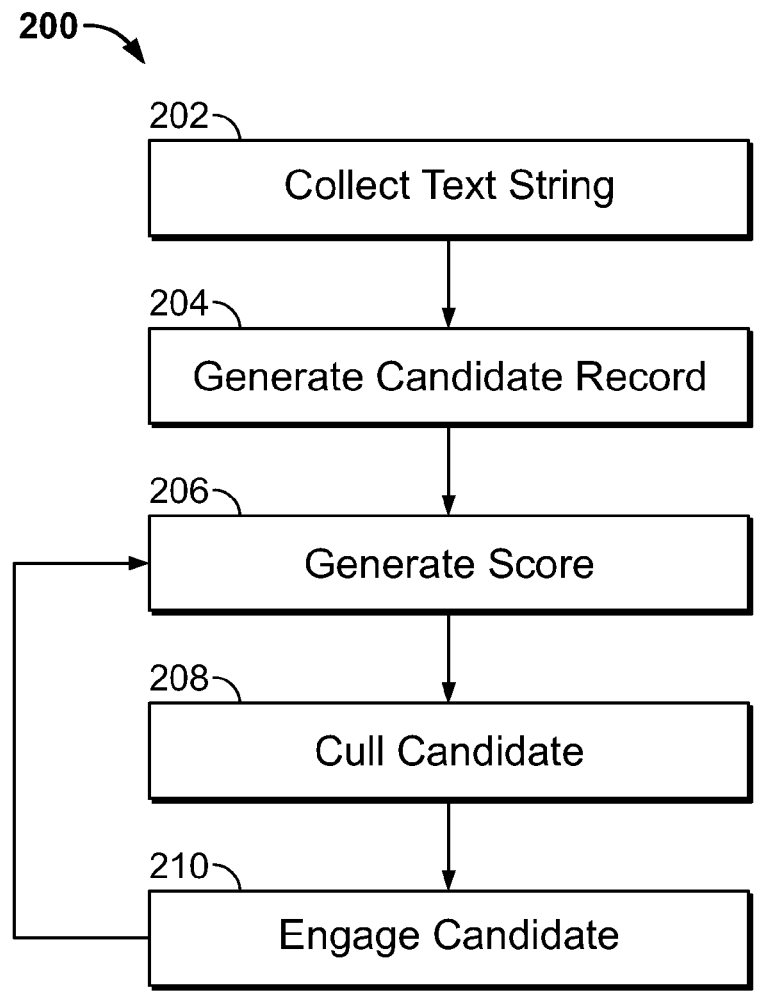
FIG. 2 shows illustrative steps of a process in accordance with the principles of the invention.

FIG. 2 shows illustrative process 200 for screening candidates. Process 200 may begin at step 202. At step 202, the system may collect the text string from a source. The source may be an electronic bulletin board, stored text messages, stored emails, stored chat session records, blogs, social networking pages, professional networking pages and any other suitable sources.

Table 1 shows illustrative text string source types.

TABLE 1

Illustrative text string source types.

| Illustrative Text String Source Type |
| --- |
| General Worldwide Web Site Server |
| Social Network Web Site Server |
| Professional Network Web Site Server |
| Blog Web Site Server |
| Professional Society Web Site Server |
| Trade Society Web Site Server |

In some embodiments, a source may be openly accessed. In some embodiments, access may require providing login and password information. For example, when text strings are to be collected from social networking pages, an account may be provided to access the pages.

A bot may be provided to identify and download text strings. In some embodiments, the bot may have some or all of the features of a web crawler. In some embodiments, the bot may have some or all of the features of a web spider. In some embodiments, the bot may be provided with preliminary screening code. The preliminary screening code may restrict or partially restrict the collection to text strings that have a minimal relation to employment.

At step 204, the system may generate for each text string a candidate record. The candidate record may include fields for information that relates to the source of the text string. The candidate record may include fields for information that relates to screening levels and scores.

At step 204, the system may check for a previously stored candidate record that is similar or identical to a newly generated candidate record. Redundant records may be deleted. Records that correspond to the same candidate may be aggregated.

At step 206, the system may generate one or more scores. The text string score may be based on the relevance of the text string to the employment requirement. Each candidate record may include one or more text string scores. Each text string score may correspond to a text string that was collected at a different screening level. When candidate records are aggregated, more than one text string and corresponding score may be associated with a single screening level. A candidate composite score may be based on one or more text string scores in the candidate record.

In some embodiments, a first score in a candidate record may be based on a predictive model. A second score may be generated at a higher screening level for the same candidate record. The second score may be compared to the first score. A difference between the first and second scores may be used to improve the predictive model.

At step 208, the system may cull the candidate. Culling may be based on one or more scores. The candidate may be culled based on a score that meets a quantitative criterion. For example, the criterion may be a number, percentage or other suitable index. The candidate may be culled based on a score that meets a qualitative criterion. For example, the criterion may be "PASS," "JOB-HUNTING," "QUALIFIED," or any other suitable qualitative criterion.

At step 210, the system may engage the culled candidate. The system may engage the culled candidate by automatically sending a message to the candidate. The system may engage the culled candidate by identifying the candidate to an individual who then sends a message to the candidate. The engagement may be performed using e-mail, text messaging, electronic chatting and the like. Process 200 may return to step 206 so that text strings from the engagement may be scored.

FIG. 3 shows stream 300 of illustrative text strings 302-330. Text strings 302-330 are illustrative of text strings that may be collected at step 202 of process 200 (shown in FIG. 2).

Figure 4:
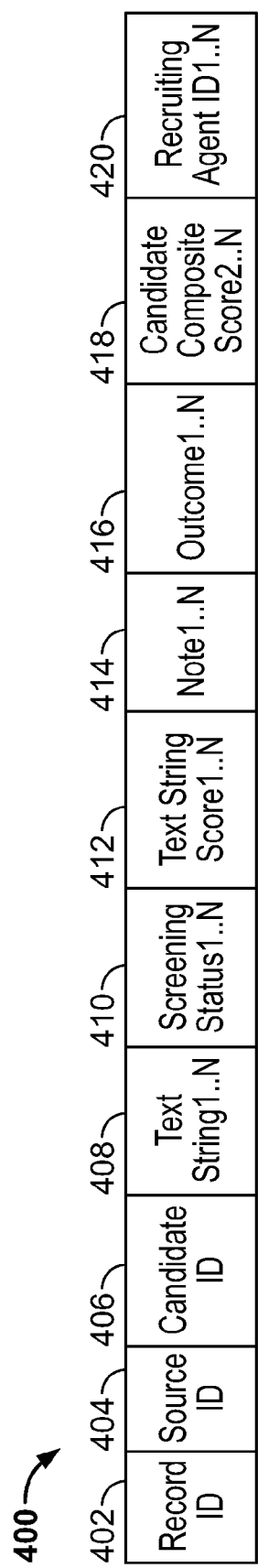
FIG. 4 shows illustrative information that may be formulated and used in accordance with the principles of the invention.

FIG. 4 shows illustrative candidate record 400. Candidate record 400 may be generated at step 204 of process 200 (shown in FIG. 2). Candidate record 400 may include fields for information such as record ID 402. Record ID 402 may be an identifier that the apparatus and methods may use to identify candidate record 400 in connection with database storage and retrieval, computation of scores, culling and the like.

Candidate record 400 may include source ID 404. Source ID 404 may identify the source, such as one of the sources from Table 1, from which a text string was collected. Candidate record 400 may include candidate ID 406.

Candidate ID 406 may be an identifier that identifies the author of the text string. Candidate ID may be a name, a screen name, a login name, an email address, a PIN, a URL, an IP address or any other suitable identifier.

Candidate record 400 may include text strings 408. Text strings 408 may include text strings 1 . . . N, which may correspond to an initially collected text string, such as one collected at step 202 of process 200 (shown in FIG. 2), and subsequently collected text strings, such as those that may be collected at step 210 of process 200.

Candidate record 400 may include screening level statuses 410. Screening level statuses 410 may include screening level statuses 1 . . . N, which may correspond to an initial screening, which may be the same as collection of text strings at step 202 of process 200 (shown in FIG. 2), and subsequently performed screenings, such as any that may be performed at step 210.

Table 2 lists illustrative screening levels.

TABLE 2

Illustrative screening levels

| Screening levels | Reference numeral(s) of examples (FIG. 5) |
|---|---|
| 1 | Initial scoring after generation of candidate record (at step 204, e.g.) |
| 2 | Screening after first candidate engagement (at step 210, e.g.) |
| 3 | Screening after second candidate engagement (at step 210, e.g.) |
| 4 | Screening after third candidate engagement (at step 210, e.g.) |
| n | Screening after nth candidate engagement (at step 210, e.g.) |
| N | Screening after final candidate engagement (at step 210, e.g.) |

Candidate record 400 may include text string scores 412. Text string scores 412 may include scores 1 . . . N, which may correspond to screening level statuses 1 . . . N. A score 1 may be computed at step 206 of process 200 (shown in FIG. 2) when a candidate record flows from step 204. Scores 2-N may be computed at step 206 when the candidate record flows from step 210.

Candidate record 400 may include notes 414. Notes 414 may include notes 1 . . . N, which may correspond to respective screening level statuses and scores. Notes 414 may be provided at step 210 by a recruiting agent at step 210 or by any other suitable individual or device.

Candidate record 400 may include outcome 416. Outcome 416 may include outcomes 1 . . . N. Each of outcomes 1 . . . N may correspond to a respective screening level 1 . . . N. Outcome 1 . . . N may indicate the disposition of the candidate at the end of the corresponding screening level. For example, an outcome may indicate that a candidate was "PROMOTED TO NEXT LEVEL," "REMOVED FROM CANDIDACY" or "OFFERED A POSITION." Outcomes 1 . . . N may indicate whether the candidate accepted an offer, declined an offer or is still considering an offer.

Candidate record 400 may include candidate composite score 418. Candidate composite score 418 may include composite scores 2 . . . N. Each of composite scores 2 . . . N may be based on a text string score (e.g., 412, shown in FIG. 4) from a "current" screening level and one or more past text string scores. For example, a composite score 4 may be based on text string scores 1, 2 and 4 or 1, 2, 3 and 4.

Candidate record 400 may include recruiting agent identification field 420. Recruiting agent identification field 420 may include identifiers for recruiting agents 1 . . . N. Recruiting agents 1 . . . N may be one or more recruiting agents that analyze, review or annotate corresponding fields (e.g., those fields that are multivalued 1 . . . N) in the candidate record or participate in dialog with the candidate.

In some embodiments, outcomes 1 . . . N may be used in conjunction with text strings 1 . . . N to provide reference or training data for use in forecasting likelihood of a match between a future candidate and the employment requirement.

Table 3 shows illustrative scoring bases that may be used in an objective function module to generate scores at step 206 of process 200 (shown in FIG. 2).

TABLE 3

Illustrative scoring bases.

| Scoring Basis | Reference numeral(s) of examples (FIG. 5) |
|---|---|
| (A) PRESENCE OF SELECTED TERMS | 502, 504, 510, 512, 514, 518, 524, 530 |
| (B) PRESENCE OF SELECTED TERMS, INTERNAL PROXIMITY OF KEY TERMS | 502, 506, 518, 524, 528, 530 |
| (C) PRESENCE OF SELECTED TERMS, SEMANTIC NETWORK LIBRARY COMPARISON TO REFERENCE TERMS | See below. |
| (D) LANGUAGE SKILL-SPELLING | 512 |
| (E) LANGUAGE SKILL-GRAMMAR | 514 |
| (F) LANGUAGE SKILL-SENTENCE STRUCTURE | 530 |
| (G) LANGUAGE SKILL-DICTION | 532 |

(A) Presence of Selected Terms

Figure 5A:
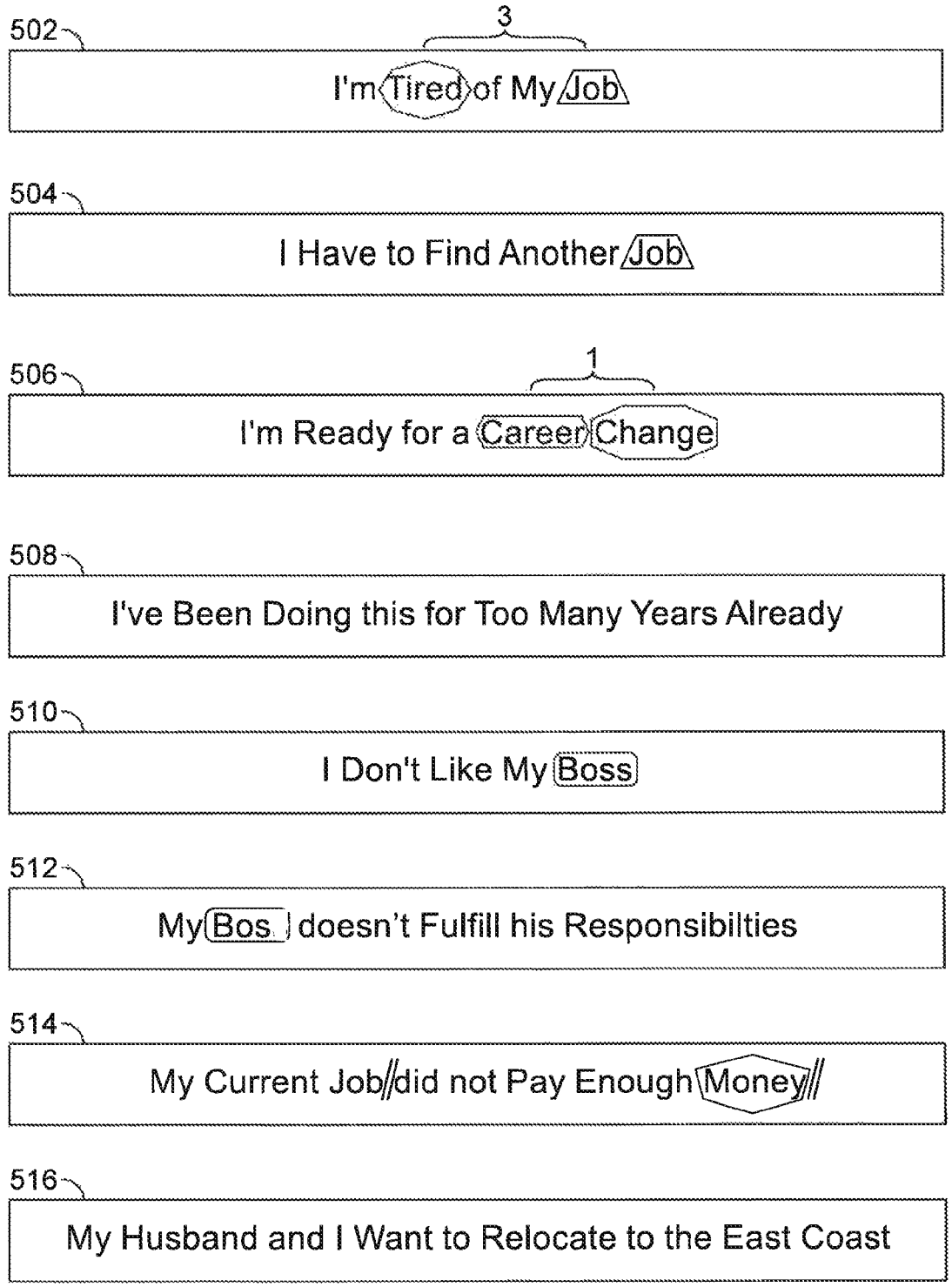
FIG. 5 shows the information of FIG. 3 with annotations in accordance with the principles of the invention.

FIG. 5 shows that key terms may be selected for searching in text string n (408). Terms such as "JOB," "CAREER," "BOSS," "MONEY," "OPPORTUNITY" and "COMPENSATION" may be selected. Text string n (408) may be scored based on the presence of the selected terms. For example, the score may be based on the number of occurrences of a selected term in text string n, the frequency of occurrence of the selected term in text string n or any other suitable metric.

(B) Presence of Selected Terms, Internal Proximity of Key Terms

FIG. 5 shows that proximity of selected terms may be computed for text string n. Relationships between the selected terms may provide information about a candidate satisfaction with current employment. For example, selected terms such as "TIRED," "READY" and "NOT ENJOYING" may have significance when proximate another selected term such as "JOB" or "CAREER." For example, in text string 502, "TIRED" is within 3 words of "JOB." In text string 506, "CAREER" is within 1 word of "CHANGE." In text string 524, "NOT" is within 1 word of "ENJOYING," which is within 2 words of "JOB."

(C) Presence of Selected Terms, Semantic Network Library Comparison to Reference Terms Semantic networks based on libraries of semantically related terms and phrases may be used to generate scores for text strings. One illustrative semantic network is Davisi (available at http://divisi.media.mit.edu), which is a project of the Commonsense Computing project of the Software Agents group at the Massachusetts Institute of Technology Media Lab, Cambridge, Mass.

The library of a semantic network may be augmented with outcome 416 of candidate record 400 (shown in FIG. 4).

(D) Language Skill-Spelling

FIG. 5 shows a spelling error in text string 512. Text string 512 may be scored based on the presence of one or more spelling errors. For example, the score may be based on the number of spelling errors in text string 512, the frequency of spelling errors in text string 512 or any other suitable metric.

(E) Language Skill-Grammar

FIG. 5 shows a grammatical error in text string 514. Text string 514 includes a verb that does not match the beginning portion of the string. Text string 514 may be scored based on the presence of one or more grammatical errors. For example, the score may be based on the number of grammatical errors in text string 514, the frequency of grammatical errors in text string 514 or any other suitable metric.

(F) Language Skill-Sentence Structure

FIG. 5 shows incorrect sentence structure in text string 530. Text string 530 may be scored based on the presence of one or more structural errors. For example, the score may be based on the number of structural errors in text string 530, the frequency of structural errors in text string 530 or any other suitable metric.

(G) Language Skill-Diction

FIG. 5 shows a diction issue in text string 532. Text string 532 may be scored based on the presence of one or more subjective or objective diction issues. For example, the score may be based on the number of diction issues in text string 532, the frequency of diction issues, the type of diction issues in text string 532 or any other suitable metric.

Figure 6:
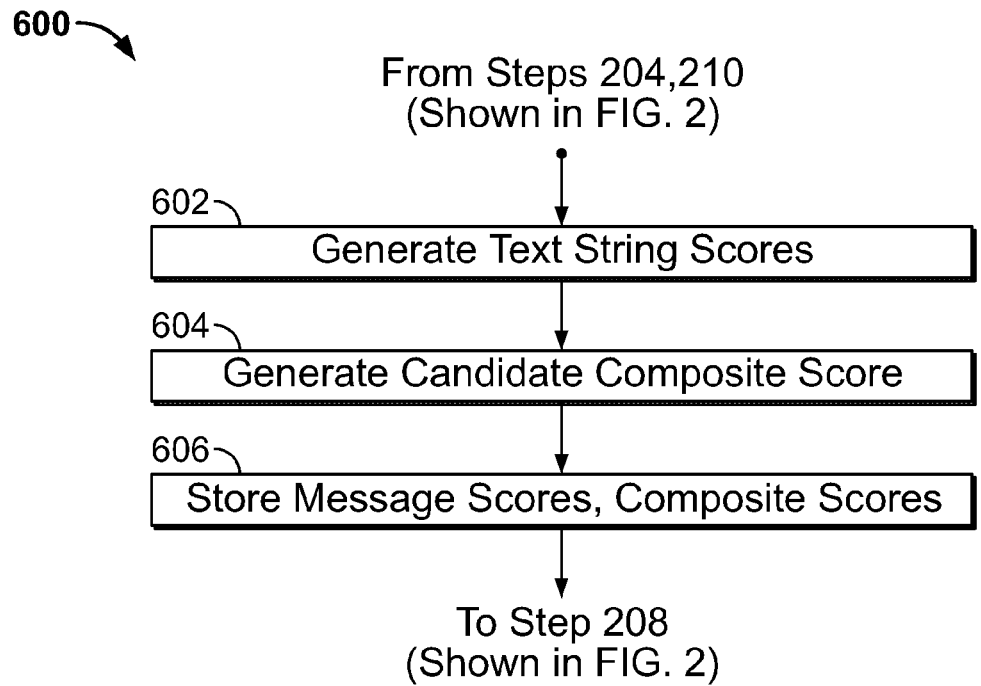
FIG. 6 shows illustrative steps of another process in accordance with the principles of the invention.

FIG. 6 shows illustrative process 600, which may be a sub-process of step 206 of process 200 (shown in FIG. 2). At step 602, the system may generate a text string score such as score n of scores 1 . . . N (412) (shown in FIG. 4). A text string score may be generated based on one or more of the bases listed in Table 2.

At step 604, the system may generate a candidate composite score such as candidate composite score n (418) (shown in FIG. 4). A candidate composite score may be generated based on one or more of the bases listed in Table 2 in conjunction with any suitable quantity based on corresponding text string scores. For example, a candidate composite score may be an average of the text string scores. The average may be a weighted average.

At step 606, the scores may be stored for analysis, reporting or any other suitable activities.

Figure 7:
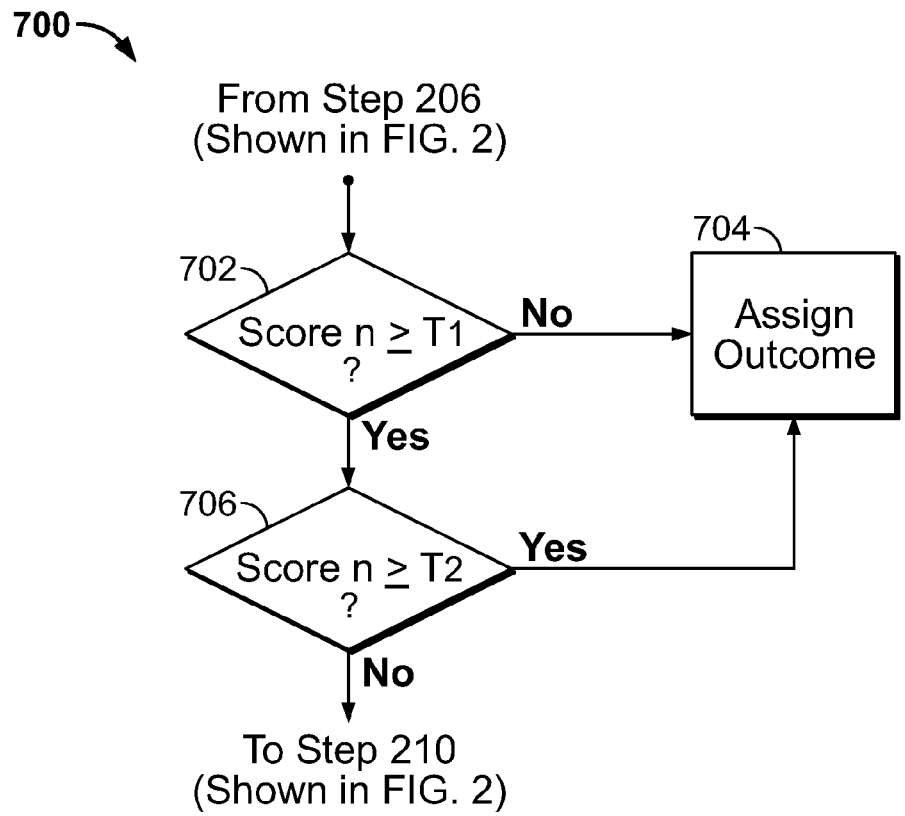
FIG. 7 shows illustrative steps of yet another process in accordance with the principles of the invention.

FIG. 7 shows illustrative process 700, which may be a sub-process of step 208 of process 200 (shown in FIG. 2). At step 702, the system may compare a score to a threshold score such as T1. The score may be a text string score such as 412, a candidate composite score such as 418 or any other suitable score. If the score does not meet or exceed T1, process 700 may continue at step 704. At step 704, the candidate may be assigned an outcome. In some embodiments, the candidate may be removed from candidacy by assigning an appropriate value (e.g., "REMOVED FROM CANDIDACY") to the outcome field (416) at the corresponding level of screening.

If at step 702 the score meets or exceeds T1, process 700 may continue at step 706. At step 706, the score may be compared to a threshold score such as T2. T2 may be higher than T1 (and thus indicate a greater likelihood of a match between the candidate and the employment requirement). If the score meets or exceeds T2, process 700 may continue at step 704. At step 704, the candidate may be assigned an outcome. In some embodiments, the candidate may be removed from candidacy by assigning an appropriate value (e.g., "INVITE TO CHAT SESSION," "INVITE FOR ORAL INTERVIEW," "EXTEND OFFER") to the outcome field (416) at the corresponding level of screening.

If at step 706, the score does not meet or exceed T2, process 700 may conclude by passing control back to process 200 (shown in FIG. 2) at step 210.

Figure 8:
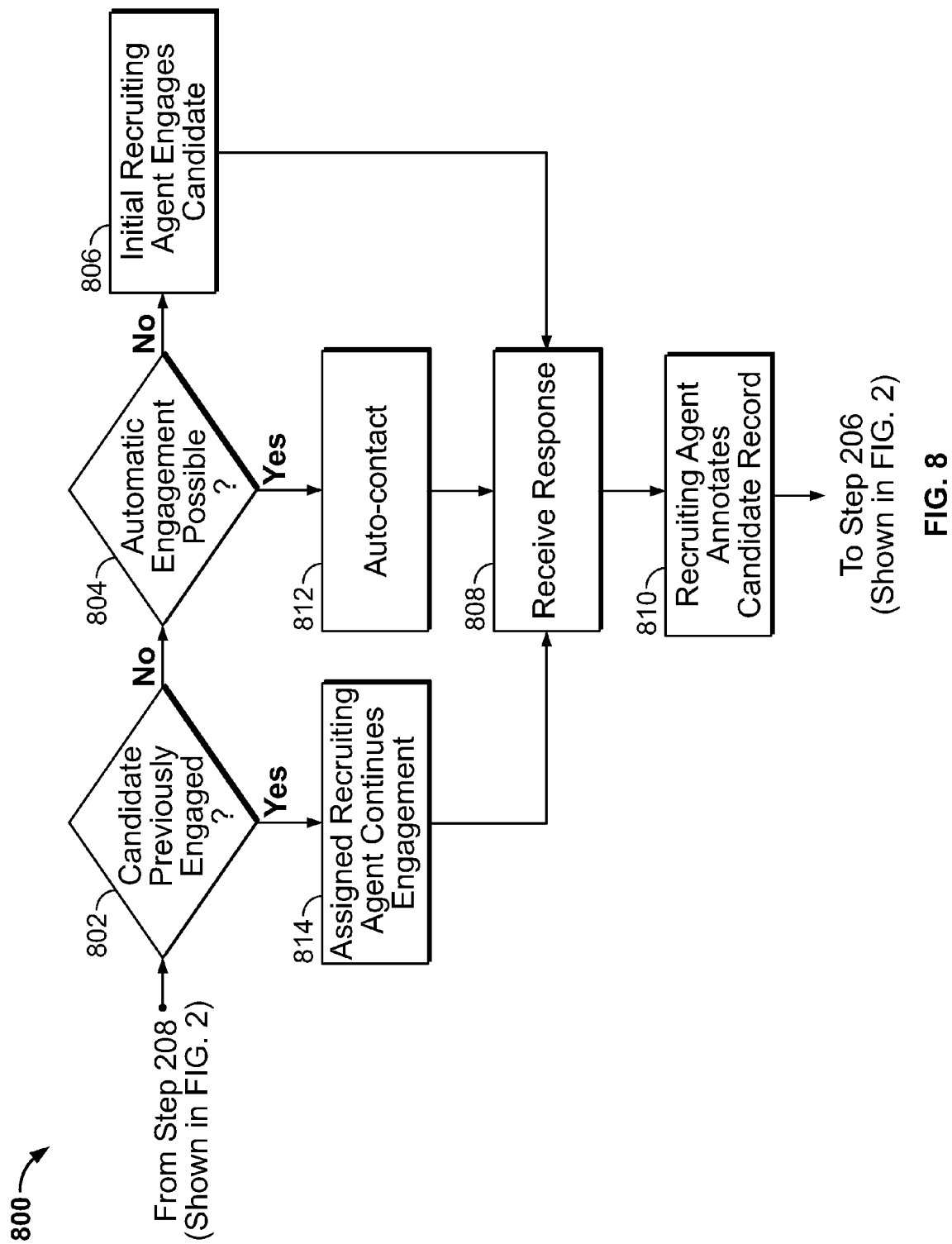
FIG. 8 shows illustrative steps of yet another process in accordance with the principles of the invention.

FIG. 8 shows illustrative process 800, which may be a sub-process of step 210 of process 200 (shown in FIG. 2). At step 802, the system may determine whether the system has previously engaged the candidate. In some embodiments, this may be accomplished by checking screening level status 410 for a screening level status of 1 or greater, which would indicate a prior analysis of the candidate's candidate record.

If the candidate has not previously been engaged, process 800 may continue at step 804. At step 804, the system may determine whether it is appropriate to automatically engage the candidate. For example, the system may decide to automatically engage the candidate if candidate record 400 (shown in FIG. 4) includes in candidate ID 406 a social network "screen name" that may be used to automatically initiate a chat session or send a suitable electronic communication.

If at step 804 the system decides not to automatically engage the candidate, process 800 may continue at step 806. At step 806, the system may pass the candidate record to an initial recruiting agent. The initial recruiting agent may use information in the candidate record, along with any other suitable information, to engage the candidate in a dialog. The dialog may involve a chat session, email, instant messaging or any other suitable avenue of communication.

At step 808, the recruiting agent may receive a response from the candidate. At step 810, the recruiting agent may annotate the candidate record note field (e.g., 414, shown in FIG. 4). In some embodiments, step 810 may include automatic transfer of text received from the candidate to the candidate record text string field (e.g., text string 408, shown in FIG. 4). In some embodiments, the recruiting agent may select some or all of the text received from the candidate for storage in the text string field.

In some embodiments, the recruiting agent may in a single engagement with the candidate sustain more than one exchange of textual information with the candidate before process 800 transfers control back to process 200 at step 206. In those embodiments, the system may store all or selected portions of the exchanges in the candidate record. In some embodiments, if selected portions are stored, the selected portions may be selected by the recruiting agent. In some embodiments, the system may automatically select the selected portions.

If at step 804 the system decides to automatically engage the candidate, process 800 may proceed at step 812. At step 812, the system may engage the candidate in a dialog using message text automatically selected based on a text string in the candidate record. Process 800 may then proceed to step 808 and continue from that step as discussed above.

If at step 802, the system determines that the system previously engaged the candidate, process 800 may proceed to step 814. At step 814, the system may use recruiting agent ID field 420 (shown in FIG. 4) to route the candidate record to the most recent recruiting agent that engaged the candidate. The recruiting agent may further pursue the engagement. Process 800 may then proceed to step 808 and continue from that step as discussed above.

In some embodiments, the system may provide a recruiting agent with scripted dialog elements for use in a dialog with the candidate. In some embodiments, the scripted dialog elements may be stored in a buffer. The dialog elements may be pasted in whole or in part into a dialog message file.

Table 4 lists illustrative scripts that the recruiting agent may use to engage the candidate. Each illustrative script corresponds to a text string topic and a dialog level.

TABLE 4

Illustrative recruiting agent scripts.

| Text String Topic | Dialog Level | Illustrative Script |
|---|---|---|
| Compensation | 1 | "It seems that you're not receiving compensation that is commensurate with the value that you're bringing to your employer." |
|  | 2 | "I hear over and over again that in this economy employers are unwilling to invest in retention of key talent." |
|  | 3 | "Are you being paid as well as others who have the same amount of experience in your field?" |
|  | 4 | "I have first-hand knowledge of compensation and benefits packages for professionals in your area of work. Let's chat off-line-when's good for you?" |
| Career growth | 1 | "This might be a good time to take a hard look at the future trajectory of your career with this employer." |
|  | 2 | "There are definitely challenging positions to fill in corporate America-even in this economy." |
|  | 3 | "Some, but not all companies, are continuing to invest in talented individuals for the long haul. You just have to commit to finding such a company." |
|  | 4 | "I have experience in placement and can talk to you about specific opportunities to develop a relationship with a company that has long-term goals for professionals. Let's chat off-line-when's good for you?" |
| Technical field transition | 1 | "Have you ever thought about the value of applying your skill set to issues in a completely different industry?" |
|  | 2 | "Most people that come to me for advice don't appreciate that the value they bring to the table can be significantly higher if they bring it to the right table." |
|  | 3 | "I know from my experience in counseling people regarding career choices that smart employers know that they can gain strategic competitive advantages by acquiring talented people with diverse skill sets, even if it's a little 'out of the box'." |

TABLE 4-continued

Illustrative recruiting agent scripts.

| Text String Topic | Dialog Level | Illustrative Script |
|---|---|---|
|  | 4 | "I have experience in placement and can help you find opportunities to leverage your existing skill set. Let's chat off-line-when's good for you?" |

Key terms such as those shown in FIG. 3, and described in connection therewith, may be selected for searching in a text string. Terms like "PAY," "SALARY," "COMPENSATION" AND "BONUS" may be used to associate the text string with the topic "Compensation." Terms like "RESPONSIBILITY," "BORING," "TIRED" and "CHALLENGE" may be used to associate the text string with the topic "Career change." Terms like "NEW," "DIFFERENT" and "CHANGE OF PACE" may be used to associate the text string with the topic "Technical field transition." Any suitable topics and any suitable selected terms may be used.

In some embodiments, the text string topic may be identified in conjunction with the scoring process.

The dialog level shown in Table 4 may represent a degree of maturity of a dialog between the recruiting agent and the candidate. Lower (numbered) dialog levels indicate appropriateness for beginning stages of the dialog, when rapport has not yet been established. Higher (numbered) dialog levels indicate appropriateness for more advanced stages of the dialog, when rapport has been established. At the higher dialog levels, the recruiter may attempt to transition the dialog into a telephonic or personal interview. In some embodiments, the recruiter may identify himself to the candidate as a recruiter. In some embodiments, a script may be provided to identify the recruiter as a candidate.

Thus, apparatus and methods for screening candidates are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for evaluating the likelihood that a candidate will match an employment requirement, the system comprising:
    an electronic data collection module comprising a transmitter and a receiver, the data collection module being configured to electronically receive, using an electronic communication network, at least one of, an e-mail, a text message, an electronic chat session and an electronically completed questionnaire, wherein the at least one of an e-mail, a text message, an electronic chat session and an electronically completed questionnaire, comprises a text string;
    an electronic computation machine that is configured to evaluate for the text string an objective function, said objective function consisting of at least one of spelling, grammar, word proximity, diction and sentence structure, said objective function yielding an output score that corresponds to likelihood of match between a candidate associated with the text string and an employment; and
    an electronic communication module configured to engage the candidate in an electronic chat session.

2. The system of claim 1 wherein the electronic computation machine is further configured to electronically determine a textual chat segment score based on a textual chat segment from the chat session.

3. The system of claim 2 wherein the electronic computation machine is further configured to select the candidate for an oral interview based on the textual chat segment score.

4. The system of claim 1 wherein the electronic computation machine is configured to compute the output score based on presence of identified words in the text string.

5. The system of claim 1 wherein the electronic computation machine is configured to compute a binary output score.

6. The system of claim 1 wherein the electronic computation machine is configured to predict a closeness of match based on a neural network.

7. The system of claim 1 wherein the electronic computation machine is configured to compute the output score based on language quality in the text string.

8. A computer usable medium having computer readable program code embodied therein, said computer readable program code adapted to be executed to implement a method for evaluating the likelihood that a candidate will match an employment requirement, the method comprising:
using at least one processor to electronically receive at least one of, an e-mail, a text message, an electronic chat session and an electronically completed questionnaire, wherein the at least one of an e-mail, a text message, an electronic chat session and an electronically completed questionnaire, comprises a text string;
using at least one processor to electronically score the text string using an objective function module, said objective function consisting of at least one of spelling, grammar, word proximity, diction and sentence structure, said objective function module yielding an output score that corresponds to likelihood of match between a candidate associated with the text string and an employment requirement; and
using at least one processor to electronically invite the candidate to participate in an electronic chat session.

9. The medium of claim 8 wherein the method further comprises, after the electronically selecting, electronically determining a textual chat segment score based on a textual chat segment from the chat session using the objective function module.

10. The medium of claim 9 wherein the method further comprises electronically selecting the candidate for an oral interview based on the textual chat segment score.

11. The medium of claim 8 wherein, in the method, the electronically scoring is based on presence of identified words in the text string.

12. The medium of claim 8 wherein, in the method, the electronically scoring comprises using the objective function module to generate a binary output score.

13. The medium of claim 8 wherein, in the method, the electronically scoring comprises using the objective function module to predict a closeness of match based on a neural network.

14. The medium of claim 8 wherein, in the method, the electronically scoring is based on language quality in the text string.

15. A method for evaluating the likelihood that a candidate will match an employment requirement, the method comprising:
electronically receiving an electronically stored at least one of, an e-mail, a text message, an electronic chat session and an electronically completed questionnaire, wherein the at least one of an e-mail, a text message, an electronic chat session and an electronically completed questionnaire, comprises a text string;
electronically scoring, using a computation machine, the text string using an objective function module, said objective function consisting of at least one of spelling, grammar, word proximity, diction and sentence structure, said objective function module yielding an output score that corresponds to likelihood of match between a candidate associated with the text string and an employment requirement; and
electronically determining, based on the output score, whether to electronically invite the candidate to participate in an electronic chat session.

16. The method of claim 15 further comprising, after the electronically selecting, electronically determining a textual chat segment score based on a textual chat segment from the chat session using the objective function module.

17. The method of claim 16 further comprising electronically selecting the candidate for an oral interview based on the textual chat segment score.

18. The method of claim 15 wherein the electronically scoring is based on presence of identified words in the text string.

19. The method of claim 15 wherein the electronically scoring comprises using the objective function module to generate a binary output score.

* * * * *